(No Model.) 7 Sheets—Sheet 1.
C. M. SYMONDS.
MACHINE FOR JOINTING AND SEAMING TIN CAN BODIES.

No. 338,887. Patented Mar. 30, 1886.

Fig. 1.

WITNESSES.
H. Monteverde.
W. T. Smith.

INVENTOR
Clarence M. Symonds
by Scrimer & Boone
his Attorneys (No Model.) 7 Sheets—Sheet 2.
C. M. SYMONDS.
MACHINE FOR JOINTING AND SEAMING TIN CAN BODIES.

No. 338,887. Patented Mar. 30, 1886.

(No Model.) 7 Sheets—Sheet 3.
C. M. SYMONDS.
MACHINE FOR JOINTING AND SEAMING TIN CAN BODIES.

No. 338,887. Patented Mar. 30, 1886.

(No Model.) 7 Sheets—Sheet 4.
C. M. SYMONDS.
MACHINE FOR JOINTING AND SEAMING TIN CAN BODIES.

No. 338,887. Patented Mar. 30, 1886.

WITNESSES
F. Monteverde
W. T. Smith

INVENTOR
Clarence M. Symonds
by Scrivner & Borne
his Attorneys (No Model.) 7 Sheets—Sheet 5.
C. M. SYMONDS.
MACHINE FOR JOINTING AND SEAMING TIN CAN BODIES.

No. 338,887. Patented Mar. 30, 1886.

WITNESSES
H. Monteverde
W. T. Smith

INVENTOR
Clarence M. Symonds
by Scrivner & Boone
his Attorneys (No Model.) 7 Sheets—Sheet 6.
C. M. SYMONDS.
MACHINE FOR JOINTING AND SEAMING TIN CAN BODIES.
No. 338,887. Patented Mar. 30, 1886.

Fig 15.

WITNESSES
J. H. Monteverde.
W. T. Smith

INVENTOR
Clarence M. Symonds
by Scrivner & Boone
his Attorneys (No Model.) 7 Sheets—Sheet 7.
C. M. SYMONDS.
MACHINE FOR JOINTING AND SEAMING TIN CAN BODIES.

No. 338,887. Patented Mar. 30, 1886.

UNITED STATES PATENT OFFICE.

CLARENCE M. SYMONDS, OF SAN FRANCISCO, CALIFORNIA.

MACHINE FOR JOINTING AND SEAMING TIN CAN-BODIES.

SPECIFICATION forming part of Letters Patent No. 338,887, dated March 30, 1886.

Application filed July 1, 1885. Serial No. 170,427. (No model.)

*To all whom it may concern:*

Be it known that I, CLARENCE M. SYMONDS, a citizen of the United States, residing at the city and county of San Francisco, State of California, have invented an Improved Machine for Jointing and Seaming Tin Can-Bodies; and I do hereby declare that the following is a full, clear, and exact description of the invention, which will enable others skilled in the art to which it most nearly appertains to make and use the same.

In the manufacture of tin bodies for cans and other tin vessels it is necessary, after the sheet-tin has been bent to the required form, to unite and seam the edges together in order to complete the body. When the can requires to be hermetically sealed, this joint or seam is united with solder; but when the can is intended to contain dry substances the edges are bent together so as to interlock and the interlocked edges pressed down into a flat seam.

My invention relates to a machine for making this latter style of seam by a single operation; and it consists of a horn or anvil, around which the piece of tin whose edges are to be united and seamed is clasped, a thin blade projecting above the surface of the anvil upon which the edges of the tin rest and over which they are bent, crimped, and interlocked, and two sliding heads arranged to move down upon the anvil, one of which carries a pressing-bit, so as to bend the edges of the tin into an interlocking position and then crimp it into an incline position under the hammer, while the other carries the hammer, which descends to flatten down the interlocked and crimped edges into a flat seam, all as hereinafter more fully described.

My machine is represented in the accompanying drawings, in which Figure 1, Sheet 1, is a side elevation of the machine. Fig. 6½, Sheet 4, is a vertical section of same parts, showing a spring-pin stop attached to pressing-bit to stop end of tin. Fig. 7½, Sheet 4, is a plan view of pressing-bit, showing application of spring pin stop or gage; Fig. 10½, Sheet 4, cross-section of same with blade and clips depressed. Fig. 13½, Sheet 5, same showing second position.

Figure 1:
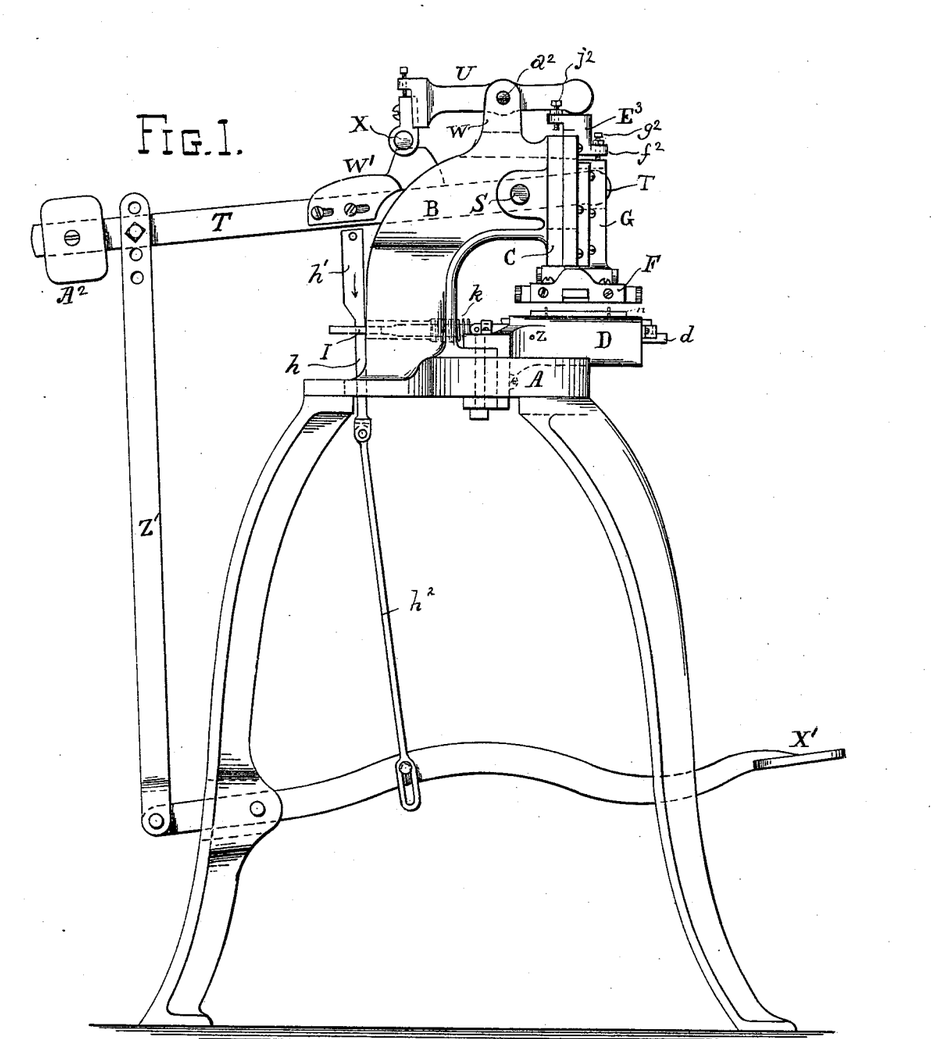
Figure 2:
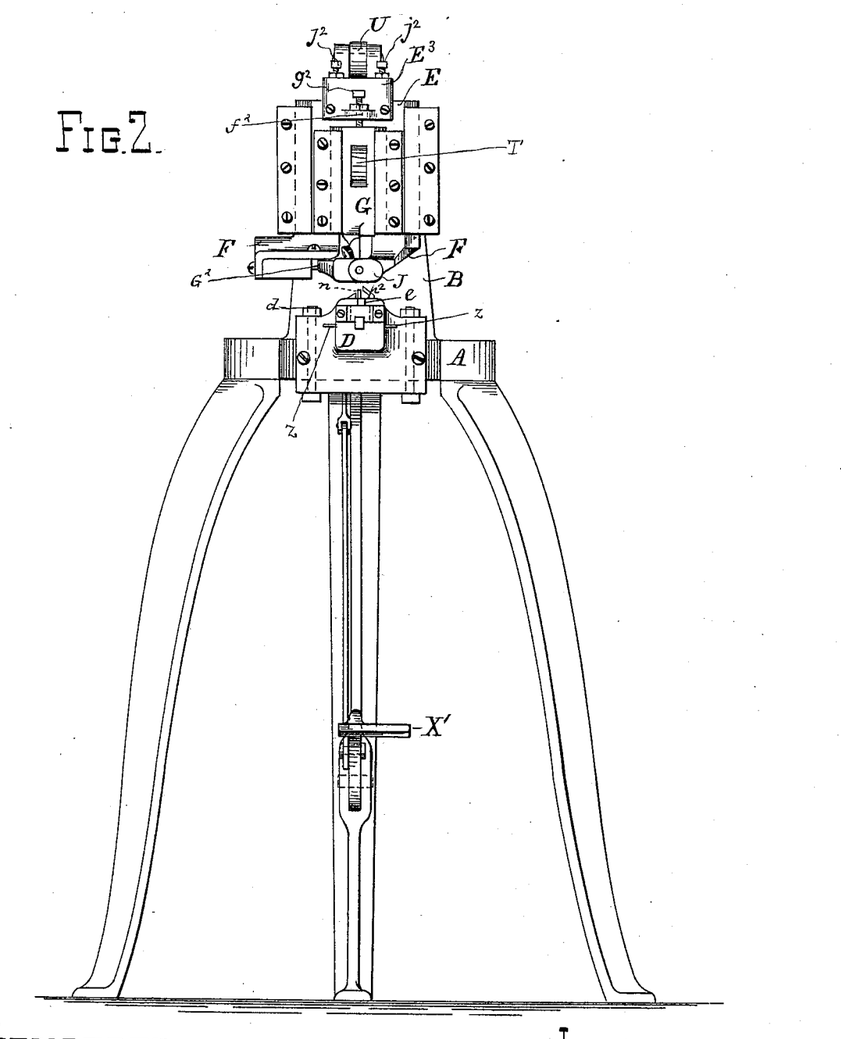
Fig. 2, Sheet 2, is a front elevation of same.
Figure 15:
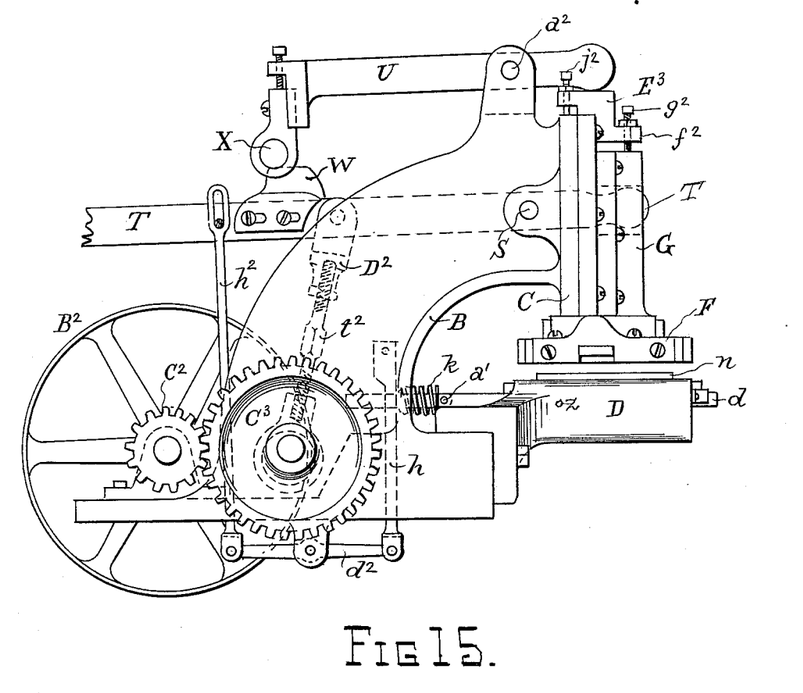
Fig. 15, Sheet 6, shows the machine with mechanism for driving with power.

A represents the base of the machine, which may be mounted on legs, as represented at Figs. 1 and 2, when the machine is to be operated by a treadle, or it may rest on any suitable support when it is to be driven by power, as represented at Fig. 15, Sheet 6.

B is a heavy curved arm or standard, which forms a permanent part of the base A, being cast in one piece with it. This arm or standard curves forward and has a broad head or flange, C, the plane of which is vertical, formed on its upper end, in the outer face of which a double slide is arranged to be moved, as hereinafter described.

A semicircular recess is formed in the front of the base A, and a horn or anvil, D, is secured to the base at the back part of the recess, so that it shall project horizontally forward underneath the middle of the head or flange C, at a short distance below it. The tin body which is to be jointed and seamed is slipped on over this horn or anvil, and the edges to be joined are crimped and interlocked and afterward flattened down upon it by the sliding heads above mentioned. The anvil can therefore be made of any desired shape, and blank forms of different sizes and shapes, according to the sizes and shapes of the bodies to be seamed, can be secured around it, as hereinafter more fully specified.

Figure 7:
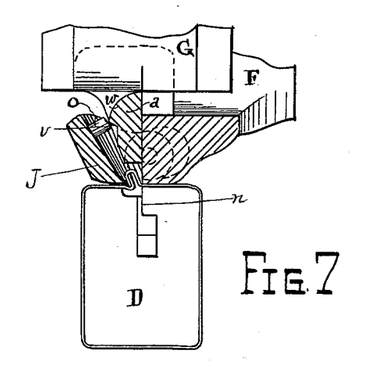
Fig. 7, Sheet 4, shows same parts with pressing-bit jamming the base of the interlocked ridge, being the second position.
Figures 7, 8:
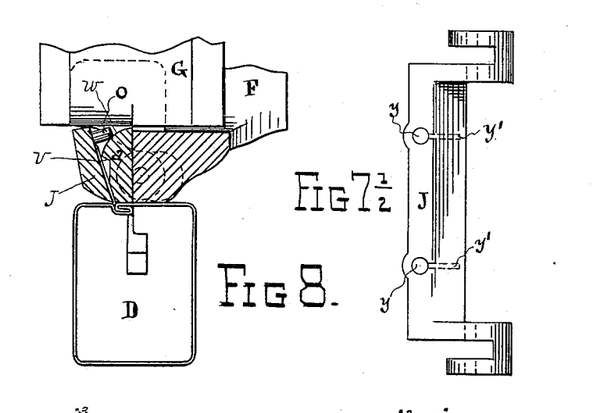
Fig. 8, Sheet 4, shows same parts in last or third position with hammer down upon anvil and joint closed.
Figure 9:
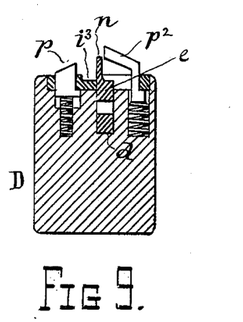
Fig. 9, Sheet 4, cross-section of anvil, showing guide, clips, and blade in their raised position.
Figure 10:
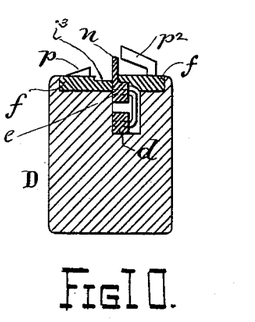
Fig. 10, Sheet 4, cross-section of same, showing link-connections.
Figure 13:
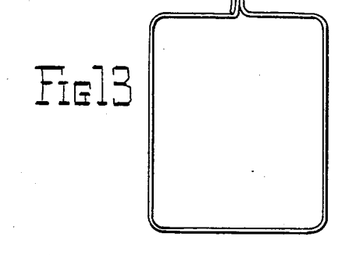
Fig. 13, Sheet 5, sectional elevation of can-body with joint in first position.
Figure 14:
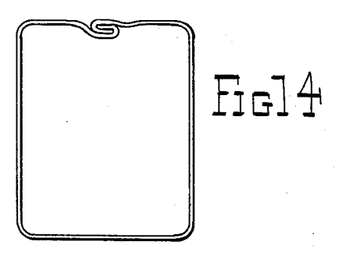
Fig. 14, Sheet 5, same showing third position.

In the present instance I have represented a rectangular form, as shown at Figs. 8, 9, and 10, Sheet 4. This form is adapted to fit a can-body such as is represented at Figs. 13 and 14, Sheet 5.

A slide, E, is fitted in ways suitably made to move up and down against the outside face of the head or flange C, above the horn or anvil D, and this slide has a foot-piece, F, at its lower end, which extends nearly the full length of the anvil. This foot-piece is divided directly above and over one half of the anvil by a channel or recess, through which the lower or hammer end of the outer slide, G, moves. The outer slide, G, is secured in proper ways or guides, so as to move up and down against the outer face of slide E. Its lower end, $a$, as above stated, passes down through the channel or recess in the foot or slide E, and extends nearly the length and parallel with the anvil. One side of this hammer-bar is vertical, and moves against the side of the recess. Its lower edge is plain, and serves as a hammer to flatten the crimped edges of the tin down upon the anvil after they have been bent into the proper interlocking position.

Running lengthwise through the upper portion of the horn or handle D, on one side of its middle line, is a channel in which two parallel bars, one above and the other below, are arranged to move. The lower bar, $d$, extends back through a hole in the arm B, as shown at Fig. 1, Sheet 1, and has a loop, I, at its rear end just back of the arm. A bar, $h$, passes through this loop and bears against the standard B, and has an inclined or beveled enlargement, $h'$, on it, which works against the outer edge of the loop when the bar $h$ is forced down, and draws the bar $d$ backward in a longitudinal direction. A spiral spring, K, encircles the bar $d$ in a chamber in the arm B, and a pin, $a'$, in front of the spring, causes the spring to be compressed when the bar is drawn back by the inclined enlargement $h'$. When the bar $h$ moves upward so as to free the inclined plane from the outer edge of loop, the spring will force the bar $d$ forward again to its first position. The upper bar, $e$, extends only the length of the anvil, and it has a thin narrow blade, $n$, projecting upward from it on one edge.

Two steel die-plates, $ff$, are sunk in the upper face of the anvil, one on each side of the channel. The die-plate on one side extends up to the edge of the channel, and is recessed to the depth and width of the seam to be made on the can, while the one on the opposite side extends partially across the channel, thus leaving a narrow slot between their edges, through which the blade $n$ of the bar $e$ is projected when the bar $e$ is forced upward against the under side of the die-plate. On the upper side of the bar $d$ are two or more short studs or pins, $jj$, and in the under side of the upper bar, $e$, are corresponding recesses, the front sides of which are beveled.

The bars $d$ and $e$ are connected by two or more free-working links, $k^2$, which serve when the lower bar, $d$, is drawn backward to draw the upper bar downward, so that the pins enter the recesses, and thus allow the upper bar to be depressed sufficiently to carry the blade $n$ below the upper surface of the anvil.

Figure 11:
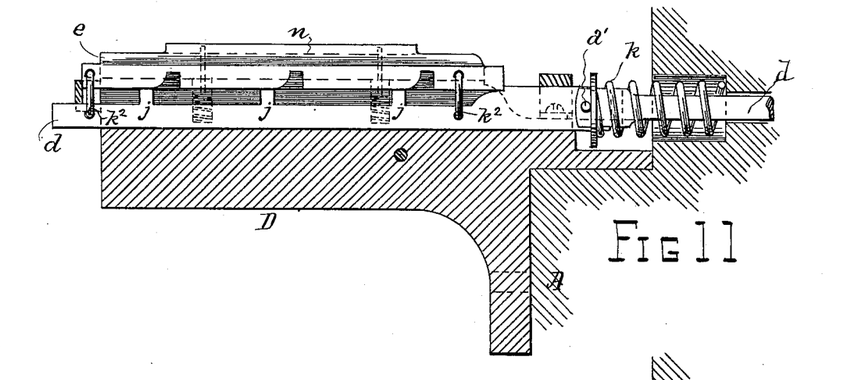
Fig. 11, Sheet 5, shows a longitudinal section of anvil with side elevation of bars, links, and blade in elevated position.
Figure 12:
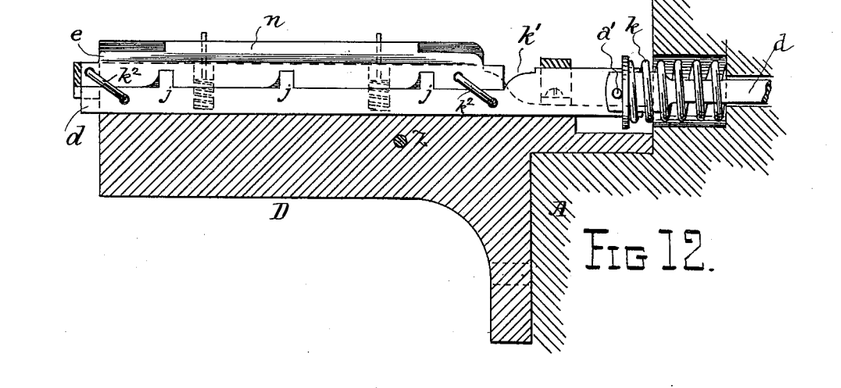
Fig. 12, Sheet 5, shows same parts in depressed position.

Fig. 11, Sheet 5, shows the lower bar forward in its first position. In this position the studs are carried forward, so that the upper bar rests upon them and the links $k'$ stand vertical, while at Fig. 12, same sheet, the lower bar, $d$, is drawn back, the upper bar, $e$, resting upon its upper face with the studs entering the recesses in its under side. When the upper bar, $e$, is thus drawn down, the blade $n$ is depressed and entirely withdrawn below the upper surface of the anvil; but when the bar $d$ is thrown forward by the spring $k$ by the withdrawal of the incline enlargement from the loop I the links supplemented by the action of the studs $j$, moving against the inclined sides of the recesses in the upper bar, $e$, will force the upper bar to its first position and project the blade $n$ up through the slot again.

On the left-hand side of the slot in the anvil I secure a spring-pin, $p$, in a socket near each end, so that it can be depressed until its upper edge is level with the upper surface of the anvil. The tops of these pins are inclined, so that they slope downward from a level with the top of the blade $n$ toward the left side of the anvil. On the opposite or right-hand side of the slot I secure other spring-pins, $p^2$, in similar sockets, only the upper ends of the latter pins are formed of wire and bent inward at an inclination, so that their extremities are just above and on one side of the blade $n$ when it is in its raised position. These pins can also be depressed into their sockets until their upper edges are level with the upper surface of the anvil.

Figure 3:
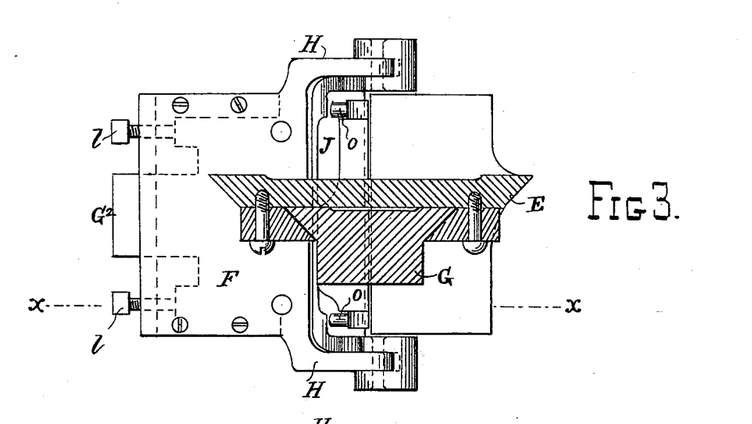
Fig. 3, Sheet 3, shows a plan of the foot-piece of the main slide.
Figure 4:
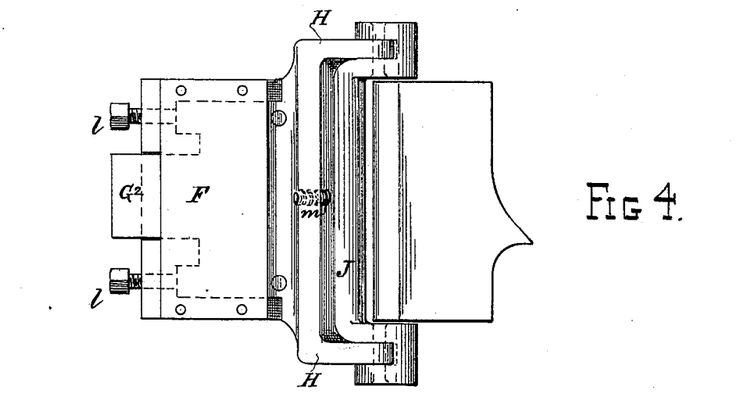
Fig. 4, Sheet 3, shows a bottom view of same.
Figure 5:
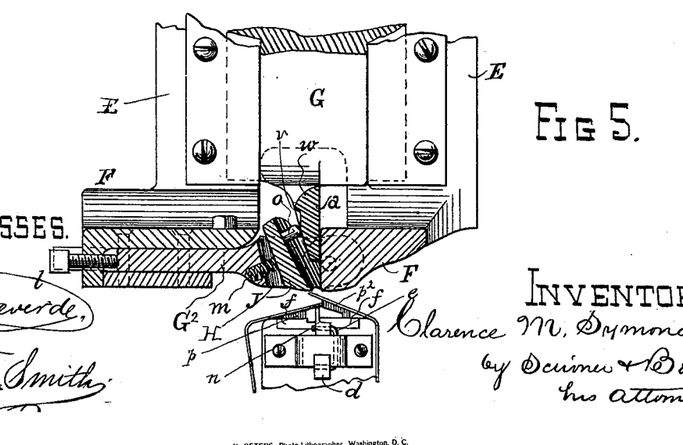
Fig. 5, Sheet 3, shows a front broken elevation of foot-piece, slide, and anvil in their preliminary position in jointing a can-body.
Figure 6:
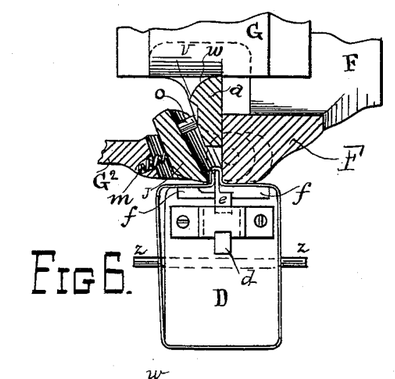
Fig. 6, Sheet 4, shows same parts closed down upon the anvil in the first position.

$G^2$, Figs. 5 and 6, is a plate which is secured in suitable guides or ways underneath the foot-piece F of the slide E, so that it can be adjusted toward or from the hammer-bar $a$ of slide G by means of set-screws $ll$. This plate is also shown in plan by dotted lines in Figs. 3 and 4, Sheet 3. This plate has an arm, H, projecting horizontally from each end across the channel or recess in the foot-piece F, and in the ends of these arms are journaled the ends of a peculiarly-constructed pressing-bit, J. This pressing-bit is hung eccentrically upon its journal at each end, so that it stands in the recess or channel in the foot-piece F alongside the hammer $a$ of the outer slide, G, and extends the full length of the hammer. This manner of suspending the pressing-bit causes it when it is pressed in toward the vertical side of the foot-piece to move downward against the anvil, and in returning from the vertical side of the recess it rises from the anvil, thus describing an evolute motion with reference to its center. The back of this pressing-bit is made rounding, and its lower edge is made comparatively sharp. It has a stud, $o$, near its upper edge at each end, which presses against the inclined face of the hammer-bar. A spring, $m$, is secured in a socket in the plate, $G^2$, so as to press against the back of the pressing-bit just above its center, so that the stud $o$ is kept snug against the inclined side of the hammer.

On the inclined side of the hammer-bar at each end I make a track opposite each of the studs $o$ for them to travel in as the hammer-bar moves up and down. This track is perpendicular until it reaches near the top of the hammer-bar, when it abruptly bulges out so as to form a projection, $v$, above which it is rounded into a curved shoulder, $w$.

I shall ordinarily form the projection $v$ by means of a roller, so as to avoid wear; but in case there should be any wear I can always take it up by means of the set-screws $l\ l$.

The slides G E are moved simultaneously and together in the first part of their downward movement until the slide E rests upon or nearly upon the anvil, as hereinafter more fully described. Slide G then has an independent downward movement, so as to carry its hammer-bar down upon and against the anvil. To accomplish this, I employ two levers. The main lever T passes through the arm B of the machine, and has its fulcrum at S, while its forward end passes through a vertical slot in the head C, and also through a like slot in the slide E, and is attached to the outer slide, G, which it moves.

U is a short lever which has its fulcrum at $a^2$ in standard W on top of the arm B. (Shown at Fig. 1, Sheet 1.) The forward end of this lever presses upon a block, $E^3$, which is secured to the upper end of the slide E, while its rear end has a roller, X, which is pressed upward by a cam-projection, W', on the lever T when that lever moves upward.

The fulcrum of the lever U is just as far from the point where its front end presses upon the block $E^3$ as the fulcrum of the lever T is from its point of pressure on the slide G, so that as long as the cam W' presses upward on the lever U the two levers move simultaneously and together; but when the roller on the end of lever U leaves the upper face of the cam the upper lever is left stationary and with an even pressure, caused by roller bearing on the convex surface of the cam, while the lower lever continues its movement alone.

On the front of the block $E^3$ is a projection, $f^2$, through which a set-screw, $g^2$, passes. This set-screw presses upon the head of the outer slide, G, while the two slides move together during the latter part of the upward movement of the two slides, and serves to keep the slide E from falling by its own weight away from the front end of lever U, and also to lift the slide E on the return movement of slide G. Two other set-screws, $j^2 j^2$, in the top of the block $E^3$ serve to stop the downward movement of the inner slide, E, just before its foot-piece strikes the face of the anvil, so that it will not rest upon and keep the tin from yielding during the hammering down operation.

The cam-projection W' is adjustable on the lever T; and the roller X is also adjustable by set screws, so that the stroke and pressure on the slide E can be regulated.

When my machine is operated by treadle or foot power, I connect the rear end of the lever T with a treadle, X', by means of a pitman, Z', and I connect the bar $h$, which moves through the loop of the lower anvil-bar, $e$, by means of a pitman-rod, $h^2$, which is also connected with the treadle. In this case I place a weight, $A^2$, on the rear end of the lever T, which serves to depress the lever after each operation. This arrangement is represented at Fig. 1, Sheet 1.

Fig. 15, Sheet 6, represents my machine with its mechanism adapted to be driven by power. In this figure, $B^2$ represents the driving-pulley. $C^2$ is a pinion on the driving-shaft, which engages with a spur-wheel, $C^3$. An eccentric on the shaft, which is driven by the spur-wheel $C^3$, is connected by a pitman, $D^2$, with the lever T, the pitman-rod passing through a slot in the standard B of the machine, and a turn-buckle, $t^2$, and check-nut serve to adjust its length. In this case I operate the bar $h$ from the lever T by means of a lever, $d^2$, which is pivoted at its middle, and a pitman, $h^2$, all as plainly represented at Fig. 15. The operation will then be as follows: The sheet of tin, having been properly bent, is slipped on over the horn or anvil D until it strikes the projecting pins $z\ z$, which serve as stops on each side. The ends of the sheet of tin will then overlap each other and rest upon the spring-pins, as shown at Fig. 5, Sheet 3—that is, the end of the tin which rests upon the shorter spring-pins will pass over and its edge will rest upon the upper edge of the blade $n$ and against the spring-pins $p^2$, that serve as a gage, while the opposite end extends above it and overlaps it, as shown. I shall ordinarily employ a spring stop or gage, $y\ y'$, on the under side of the pressing-bit, as represented at Figs. $6\frac{1}{2}$ and $7\frac{1}{2}$, Sheet, 4, against which the upper overlapping edge of the tin will bear when it is ready to be operated on by the machine, so that the interlocked edges will both of them be gaged and measured. The treadle is then depressed, causing the two slides E G to move downward together until the foot-piece of slide E rests upon or nearly upon the anvil, the set-screw $j^2\ j^2$ serving, as before stated, to stop the downward motion of the slide and foot-piece just before it actually comes in contact with the anvil. During this downward movement of the two slides, which I will call the "first" part of the operation, the point or lower edge of the pressing-bit and the shoulder of the foot-piece opposite it press the edges of the tin down on each side of the blade $n$ and bend them to the interlocking position shown at Fig. 13, Sheet 5. At this stage of the operation the slide E is down as far as it can go and rests upon the set-screws, and is kept there with a steady pressure caused by the roller X rolling over the convex surface of the cam-projection on the lever T. The lever T, however, keeps moving upward, thus causing the outer slide, G, to move downward and carry its hammer-bar $a$ toward the anvil. During the time which elapses while the studs $o$ of the pressing-bit are traversing their tracks between the lower end of the hammer-bar and the enlargement $v$ the pressing-bit remains stationary, but during that time the beveled enlargement $h'$ on the bar $h$, which works through the loop I of the lower parallel bar, $d$, inside the anvil, acts upon the loop and draws the bar $d$ back, causing the upper bar, $e$, to be drawn down, carrying with it the blade $n$ down through the slot and out of the way, leaving the face of the anvil clear. The continued downward movement of the hammer-bar causes the enlargements or projections $v$ to force the upper end of the pressing-bit quickly outward as the studs $o$ ride over the projections. This movement causes the lower edge of the pressing-bit to swing in and down into the shallow channel on the anvil and to compress the standing interlocked edges of tin across the space which was occupied by the blade $n$ before it was withdrawn. This pressure and compression takes place close to the top of the anvil, and the standing interlocked edges are thereby canted to an inclined position under the hammer-bar, as shown at Fig. 7, Sheet 4. The studs then ride over the rounded shoulders above the projections $v$, and the spring presses the upper edge of the pressing-bit inward, thus carrying its lower edge out from under the hammer and raising it from the anvil by its eccentric motion. The hammer-bar then comes down on the inclined or canted edges and flattens them down into the shallow channel $i^3$, thus completing the seam. This last position is shown at Fig. 8, Sheet 4. These several operations are accomplished successively as the lever is being depressed by the foot, so that a single movement of the lever completes the jointing and seaming of a can-body.

Figure 16:
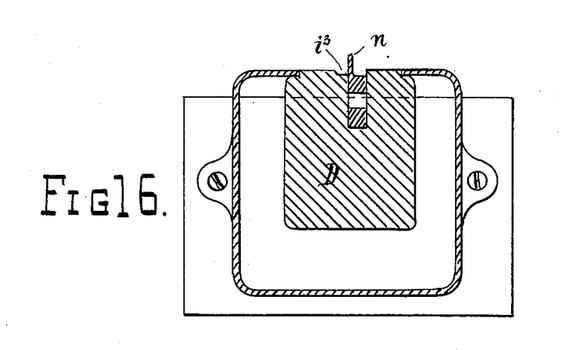
Fig. 16, Sheet 7, shows section of an anvil, foot-piece, and hammer in third position.
Figure 17:
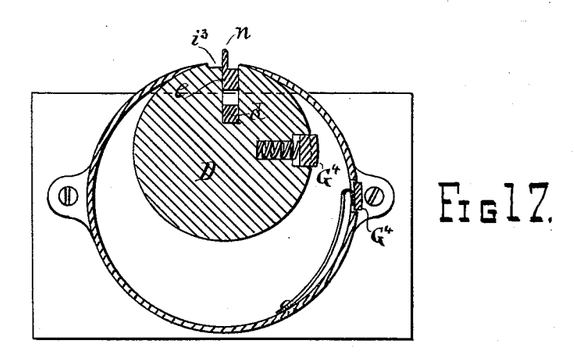
Fig. 17, Sheet 7, shows section of anvil with square sheet-metal forms attached.
Figure 18:
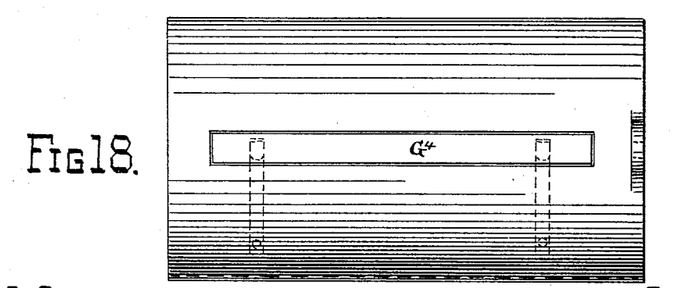
Fig. 18, Sheet 7, shows same section with circular form attached.

In seaming can-bodies on this machine it is necessary that the sheets of tin should fit snugly around a form, in order that their edges may properly overlap and be held in proper position with reference to each other on the anvil. To provide for this, I have separate hollow forms for each size of can-body, and secure each form as it is needed around the anvil, as represented at Figs. 16, 17, and 18, Sheet 7. These forms are made by bending sheet metal to a circular or other shape, and securing them by screws to the base A, so that they surround the anvil with the top of the anvil exposed on top. In making circular bodies I provide a spring-pad, $G^4$, on one side of the circular form, which will prevent the body from being hugged too close to the form by the drawing in of the joint or seam; otherwise it would be difficult to withdraw the body from the form after it is seamed.

Having thus described my invention, what I claim, and desire to secure by Letters Patent, is—

1. In a machine for jointing and seaming can-bodies, the horn or anvil D, having the blade $n$, arranged to be projected up through a slot in its upper face which extends through its length, and provided with spring-pins $p$ on one side and $p^2$ on the opposite side, in combination with the slide E with its divided foot-piece F, having the adjustable plate with its arms and eccentrically-suspended pressing-bit, and the slide G with its hammer-bar $a$, substantially as described.

2. A machine for jointing and seaming can-bodies, consisting of the base A, with its curved arm B, and having a semicircular recess in its front, and an anvil bar, D, projecting horizontally from its base in said recess and carrying the blade $n$ and spring-pins $p$ and $p^1$, a vertical head, C, on the end of the curved arm, and vertically-moving slides E G, provided with crimping and forming devices, which act upon the edges of the tin, so as to crimp, bend, interlock, and flatten them into a union-seam upon the anvil, substantially as described.

3. In combination with the base A, provided with a horizontally-projecting horn or anvil, D, in which a blade, $n$, is arranged to be automatically projected above its surface and then withdrawn below its surface through a slot in its upper face, a sliding head, E, having a foot-piece, F, which is divided by a channel extending parallel with the anvil, and which carries in said channel a pressing or crimping bit, and a vertically-moving hammer-bar, $a$, arranged to move down through the channel and flatten the edges of tin upon the anvil, substantially as described.

4. In combination with a horizontal horn or anvil, D, having a blade, $n$, arranged to project upward through a slot in its upper face, and provided with mechanism for withdrawing said blade below the surface of the anvil, and the spring-pins $p$ $p^2$ on opposite sides of the blade $n$, a descending foot-piece, F, which carries a pressing or crimping bit, and a hammer-bar, $a$, which is arranged to move down upon the anvil after the foot-piece and crimping-bit have completed their action, substantially as described.

5. The horn or anvil D, having a channel extending longitudinally through it, above which are secured two die-plates, $f\,f$, one of them provided with the depression $i^3$, so as to leave a narrow slot, $i$, between them, and having a bar, $e$, which is provided with a blade, $n$, placed in said channel so that its blade will pass through the slot $i$, in combination with suitable mechanism for raising and lowering said bar $e$, so as to alternately project the blade above and withdraw it below the surface of the anvil, substantially as described.

6. In a machine for jointing and seaming tin can-bodies, the anvil D, provided with the die-plates $ff$, and intermediate narrow slot, $i$, and having the bar $e$, with its blade $n$, and recesses in its under side arranged in a channel below said slot, in combination with the parallel longitudinally-moving lower bar, $d$, connected with the bar $e$ by links $k$, said lower bar, $d$, having studs $jj$, corresponding with the recesses in the under side of bar $e$, substantially as described.

7. In a machine for jointing and seaming tin can-bodies, the anvil D, having a narrow blade, $n$, arranged to be projected above its upper surface, and provided with the short inclined spring-pins $p$ on one side of the slot, and the long spring-pins $p^2$ on the opposite of the slot, to serve as guides, and stops for the edges of the tin and to hold them in the proper position with reference to the blade $n$, substantially as described.

8. In a machine for jointing and seaming tin can-bodies, having a horizontal horn or anvil, D, provided with a thin blade, $n$, arranged to be projected up through a slot in its upper surface, a channeled foot-piece, F, arranged to move down upon the anvil, said foot-piece having an adjustable sliding plate, $G^2$, provided with arms H at each end, in which is journaled eccentrically a pressing or crimping bit, J, substantially as described.

9. In a machine for jointing and seaming tin can-bodies, the eccentrically-suspended pressing or crimping bit J, mounted in a channel in the foot-piece F of a slide, E, and provided with the studs $o$, near its upper edge on one side, and pressed forward by a spring, $m$, above its center on the opposite side, in combination with the vertically-moving hammer-bar $a$, which is provided with tracks in which the studs $o$ traverse, said tracks having a projection $v$, and curved shoulder $w$ by means of which the pressing-bit is moved to crimp the interlocked edges of tin and withdrawn in time to avoid the descending hammer, substantially as described.

10. In a machine for jointing and seaming tin can-bodies, the outer slide, G, carrying the hammer-bar $a$, moved by the main lever T, which passes through a vertical slot in the slide E, in combination with inner slide, E, with its divided foot-piece F, having the adjustable plate carrying the eccentrically-suspended compressing-bit, which is moved by the short lever U by means of the cam-projection or short lever-bearing Y on the lever T, and the adjustable contact-point, consisting of the projection $f^2$ on the block $E^3$, and the set-screw $g^2$, for bearing on the head of the outer slide, substantially as described.

In witness whereof I have hereunto set my hand this 4th day of June, A. D. 1885.

CLARENCE M. SYMONDS.

Witnesses:
JNO. L. BOONE,
F. E. MONTEVERDE.